(12) United States Patent
Case et al.

(10) Patent No.: US 9,128,552 B2
(45) Date of Patent: Sep. 8, 2015

(54) ORGANIZING DISPLAY DATA ON A MULTIUSER DISPLAY

(71) Applicant: LENOVO (Singapore) PTE, LTD., New Tech Park (SG)

(72) Inventors: Michaela Rose Case, Raleigh, NC (US); Howard Locker, Cary, NC (US); John Weldon Nicholson, Cary, NC (US); Aaron Michael Stewart, Raleigh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 79 days.

(21) Appl. No.: 13/944,719

(22) Filed: Jul. 17, 2013

(65) Prior Publication Data

US 2015/0022480 A1     Jan. 22, 2015

(51) Int. Cl.
*G06F 3/041*         (2006.01)
(52) U.S. Cl.
CPC ..................... *G06F 3/041* (2013.01)
(58) Field of Classification Search
CPC ....... G06F 3/033; G06F 3/041; G06F 3/0412; G06F 3/0416; G06F 3/04845; G06F 3/04883; G06F 2200/1614
USPC ................. 345/156, 157, 173, 649, 650, 659; 715/863
See application file for complete search history.

(56) References Cited

U.S. PATENT DOCUMENTS

| | | | |
|---|---|---|---|
| 7,724,242 B2 | 5/2010 | Hillis et al. | |
| 7,728,821 B2 | 6/2010 | Hillis et al. | |
| 8,072,439 B2 | 12/2011 | Hillis et al. | |
| 2005/0285845 A1* | 12/2005 | Dehlin | 345/173 |
| 2006/0031786 A1 | 2/2006 | Hillis et al. | |
| 2006/0274046 A1 | 12/2006 | Hillis et al. | |
| 2007/0046643 A1 | 3/2007 | Hillis et al. | |
| 2007/0220444 A1 | 9/2007 | Sunday et al. | |
| 2007/0273670 A1 | 11/2007 | Nordahl | |
| 2007/0300182 A1 | 12/2007 | Bilow | |
| 2008/0192059 A1 | 8/2008 | Kennedy | |
| 2008/0240514 A1 | 10/2008 | Zhang et al. | |
| 2009/0085881 A1* | 4/2009 | Keam | 345/173 |
| 2009/0164938 A1 | 6/2009 | Wang | |
| 2009/0273559 A1* | 11/2009 | Rofougaran et al. | 345/156 |
| 2010/0033549 A1* | 2/2010 | Sato | 345/157 |
| 2010/0083109 A1 | 4/2010 | Tse et al. | |
| 2010/0095233 A1 | 4/2010 | Skourup et al. | |
| 2010/0117979 A1 | 5/2010 | Hillis | |
| 2010/0225595 A1 | 9/2010 | Hodges et al. | |
| 2010/0281440 A1 | 11/2010 | Underkoffler et al. | |
| 2010/0318904 A1 | 12/2010 | Hillis et al. | |
| 2011/0022991 A1 | 1/2011 | Hillis et al. | |
| 2011/0032215 A1 | 2/2011 | Sirotich et al. | |
| 2011/0047478 A1 | 2/2011 | Ellsworth | |
| 2011/0111833 A1 | 5/2011 | Nordahl et al. | |

(Continued)

OTHER PUBLICATIONS

U.S. Appl. No. 13/907,285, Office Action, Jan. 21, 2015.

(Continued)

*Primary Examiner* — Regina Liang

(74) *Attorney, Agent, or Firm* — Kunzler Law Group

(57) ABSTRACT

For organizing display data on a multiuser display, a position module determines a first user position from the disposition of a first touch object on the multiuser display. An organization module organizes the display data on the multiuser display in response to the first user position.

18 Claims, 9 Drawing Sheets

(56) References Cited

U.S. PATENT DOCUMENTS

| | | |
|---|---|---|
| 2011/0119624 A1 | 5/2011 | Coldefy et al. |
| 2011/0175920 A1 | 7/2011 | Ieperen |
| 2011/0197263 A1 | 8/2011 | Stinson, III |
| 2011/0284296 A1 | 11/2011 | Harel et al. |
| 2012/0249463 A1* | 10/2012 | Leung et al. .......... 345/173 |
| 2012/0268372 A1 | 10/2012 | Park et al. |
| 2012/0274598 A1 | 11/2012 | Uy |
| 2012/0316876 A1 | 12/2012 | Jang et al. |
| 2013/0050131 A1 | 2/2013 | Lee et al. |
| 2013/0055143 A1 | 2/2013 | Martin et al. |
| 2013/0083074 A1 | 4/2013 | Nurmi et al. |
| 2013/0093708 A1 | 4/2013 | Annett et al. |
| 2013/0100057 A1 | 4/2013 | Annett et al. |
| 2013/0162600 A1* | 6/2013 | Chou et al. .......... 345/175 |
| 2013/0191753 A1 | 7/2013 | Sugiyama et al. |
| 2013/0278507 A1 | 10/2013 | Hintermeister |
| 2013/0318445 A1 | 11/2013 | Mitchell et al. |
| 2014/0136981 A1 | 5/2014 | Xiang et al. |
| 2014/0152537 A1 | 6/2014 | Abdelsamie et al. |
| 2014/0267130 A1 | 9/2014 | Hwang et al. |

OTHER PUBLICATIONS

U.S. Appl. No. 13/967,200, Office Action, Jan. 5, 2015.

Michelle Annett et al., "Medusa: A Proximity-Aware Multi-touch Tabletop", UIST 2011 Conference Proceedings: ACM Symposium on User Interface Software & Technology, pp. 337-382, (Published 2011), http://autodeskresearch.com/pdf/p337.pdf> (Retrieved: Jan. 7, 2015).

"Medusa: A Proximity-Aware Multi-touch Tabletop", YouTube video (Published by Autodesk Research on Dec. 14, 2012), https://www.youtube.com/watch?v=rjbKmyxCuEw (Retrieved Jan. 7, 2015).

U.S. Appl. No. 13/967,200, Office Action, May 28, 2015.

U.S. Appl. No. 13/907,285 Office Action, Jun. 29, 2015.

\* cited by examiner

ORGANIZING DISPLAY DATA ON A MULTIUSER DISPLAY

BACKGROUND

1. Field

The subject matter disclosed herein relates to multiuser displays and more particularly relates to organizing display data for a multiuser display.

2. Description of the Related Art

The users of traditional small displays and monitors had to be positioned within a relatively small area to view the display, so that a single organization of data relative to the user's position was sufficient. However, large multiuser displays allow a user to interact with the display from many positions.

BRIEF SUMMARY

An apparatus for organizing display data on a multiuser display is disclosed. A memory stores machine readable code executable by a processor. The machine readable code includes a position module and an organization module. The position module determines a first user position from the disposition of a first touch object on the multiuser display. The organization module organizes the display data on the multiuser display in response to the first user position. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
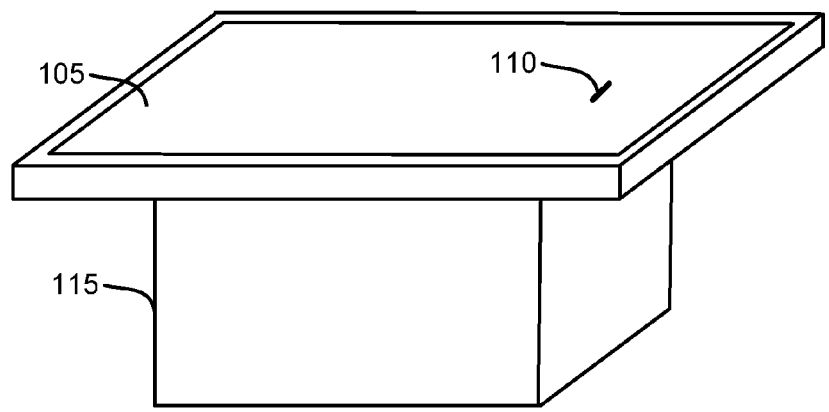
FIG. 1 is a perspective drawing illustrating one embodiment of a multiuser display.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wire-line, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

FIG. 1 is a perspective drawing illustrating one embodiment of a multiuser display 105. The multiuser display 105 may be a touchscreen display. In one embodiment, the multiuser display 105 is a HORIZON® display manufactured by Lenovo of Morrisville, N.C.

In the depicted embodiment, the multiuser display 105 is disposed horizontally so the user may interact with the multiuser display 105 as though interacting with the tabletop. The multiuser display 105 may be mounted on a stand 115. Alternatively, the multiuser display 105 may be portable. For example, the multiuser display 105 may be set upon a tabletop.

In one embodiment, the multiuser display 105 includes a computer. Alternatively, the multiuser display 105 may communicate with a computer. In one embodiment, the multiuser display 105 is a flexible medium. The multiuser display 105 may be rolled for transport and unrolled for use. The multiuser display 105 may be held by one or more users, rotated during use, and the like. In one embodiment, the multiuser display has a longitudinal dimension greater than 100 centimeters (cm).

A user may interact with the multiuser display 105 through a touch object 110. The touch object 110 may be an electronic pen, a stylus, a finger, a knuckle, and the like. Alternatively, the user may interact with a multiuser display 105 through virtual keyboard.

In the past, the small size and substantially vertical mounting of displays limited the positions from which a user could interact with the display. However, a user can interact with the multiuser display 105 from many positions. In addition, multiple users can concurrently interact with the multiuser display 105 from substantially different positions and orientations. As a result, traditional static orientations of display data do not take full advantage of the capabilities of a multiuser display 105.

The embodiments described herein determine a user position from the disposition of a touch object 110 on the multiuser display 105. The embodiments further organize display data on the multiuser display 105 in response to the user position as will be described hereafter.

Figure 2:
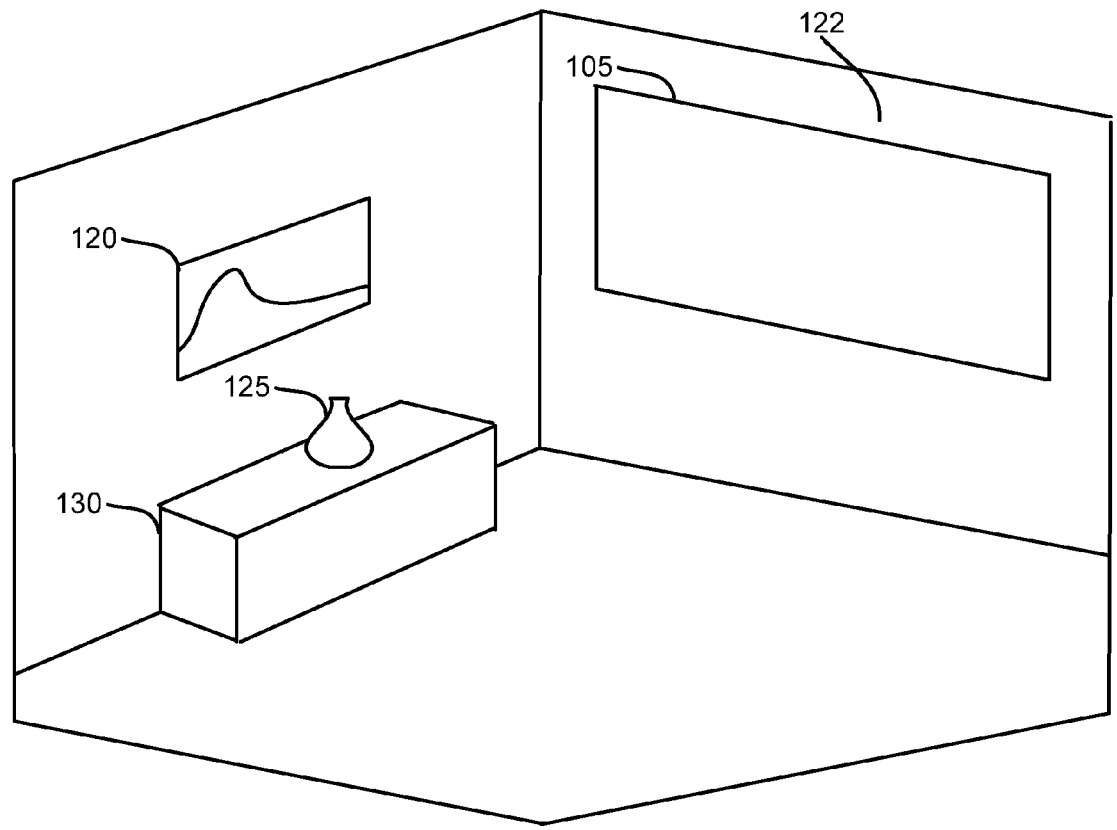
FIG. 2 is a perspective drawing illustrating one alternate embodiment of a multiuser display.

FIG. 2 is a perspective drawing illustrating one alternate embodiment of a multiuser display 105. In the depicted embodiment, the multiuser display 105 is mounted on a wall 122. Alternatively, the multiuser display 105 may comprise a projection onto the wall 122. The interactions of the touch object 110 with the projection may be detected optically.

In one embodiment, the multiuser display 105 embodies a computer. Alternatively, the multiuser display 105 and/or projection for the multiuser display may be in communication with a computer.

Figure 3:
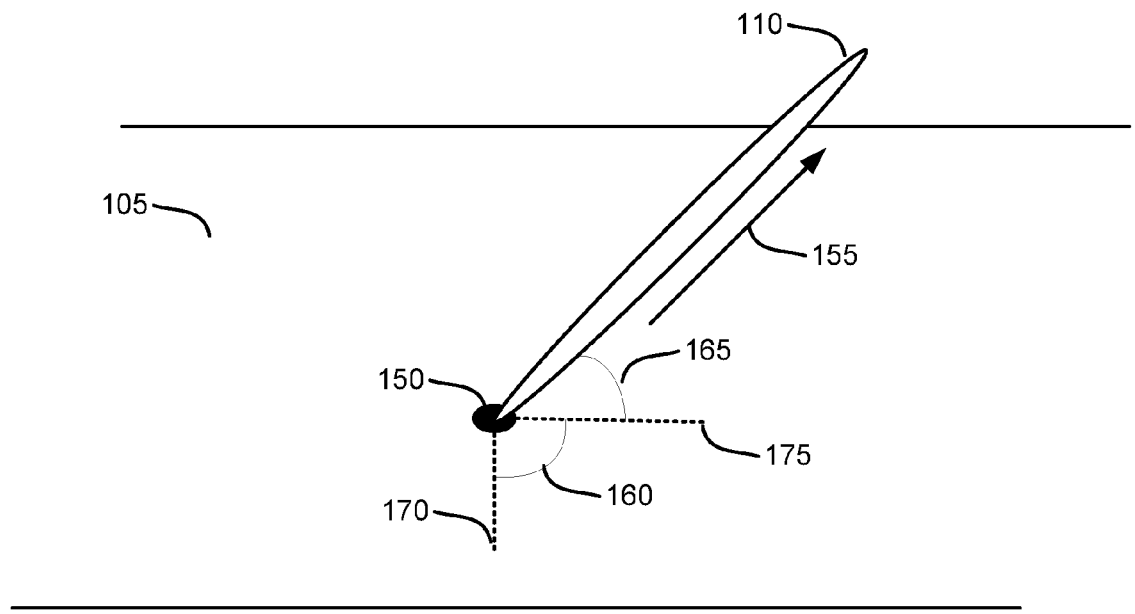
FIG. 3 is a perspective drawing illustrating one embodiment of the touch object disposed on a multiuser display.

FIG. 3 is a perspective drawing illustrating one embodiment of the touch object 110 disposed on a multiuser display 105. The touch object 110 may be in physical communication with the multiuser display 105 at a location 150. The touch object 110 may also have an orientation 155. The orientation 155 may be a vector. Alternatively, the orientation may include a first angle 160 from a specified axis 170 of the multiuser display 105 and a second angle 165 from a plane 175 of the multiuser display 105.

In one embodiment, the touch object 110 is an electronic pen. The electronic pen touch object 110 may communicate wirelesly with the multiuser display 105. In one embodiment, the touch object 110 communicates a touch object identifier to the multiuser display 105. The touch object identifier may uniquely identify the touch object 110. Alternatively, the touch object identifier may uniquely identify the user of the touch object 110.

In one embodiment, the touch object 110 is detected using a detection selected from the group consisting of electromagnetic resonance detection, electric field detection, capacitance detection, and optical detection. The touch object 110 may include one or more accelerometers. The accelerometers may determine the orientation 155 of the touch object 110.

Figure 4:
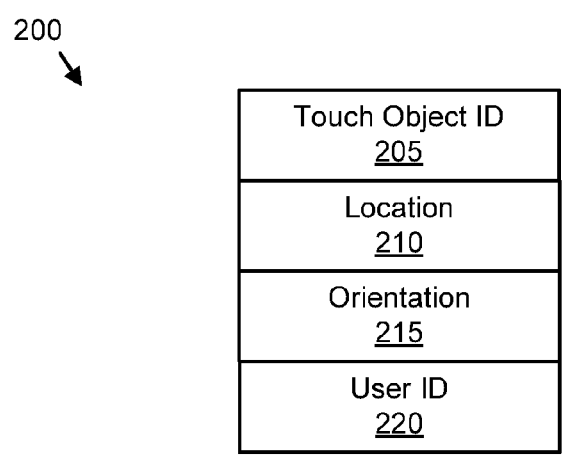
FIG. 4 is a schematic block diagram illustrating one embodiment of a touch object data record.

FIG. 4 is a schematic block diagram illustrating one embodiment of a touch object data record 200. The touch object data record 200 may be stored by the multiuser display 105. Alternatively, the touch object data record 200 may be stored on a computer in communication with the multiuser display 105. The touch object data record 200 includes a touch object identifier 205, location record 210, an orientation record 215, and a user identifier 220.

The touch object data record 200 includes the touch object identifier 205. In one embodiment, the touch object identifier 205 is received from the touch object 110. In an alternative embodiment, the multiuser display 105 may query the user for the identity of the user and/or the touch object 110 in response to the multiuser display 105 detecting the touch object 110.

In one embodiment, the touch object identifier 205 includes a biometric identifier. For example, the multiuser display 105 may record a fingerprint biometric identifier from a finger touch object 110.

The location record 210 may store the location 150. In one embodiment, the location record 210 is a pixel address. Alternatively, the location record 210 may be a coordinate pair. The orientation record 215 may store the vector of the orientation 155, the first angle 160, the second angle 165, or combinations thereof.

The user identifier 220 may uniquely identify the user. The user identifier 220 may include a username, a user identification number, a user password, a pointer to user data, user preferences, or combinations thereof. In one embodiment, the multiuser display 105 determines the user identifier 220 from the touch object identifier 205. Alternatively, the multiuser display 105 may query a user for one or more portions of the user identifier 220 in response to detecting the touch object 110.

Figure 5A:
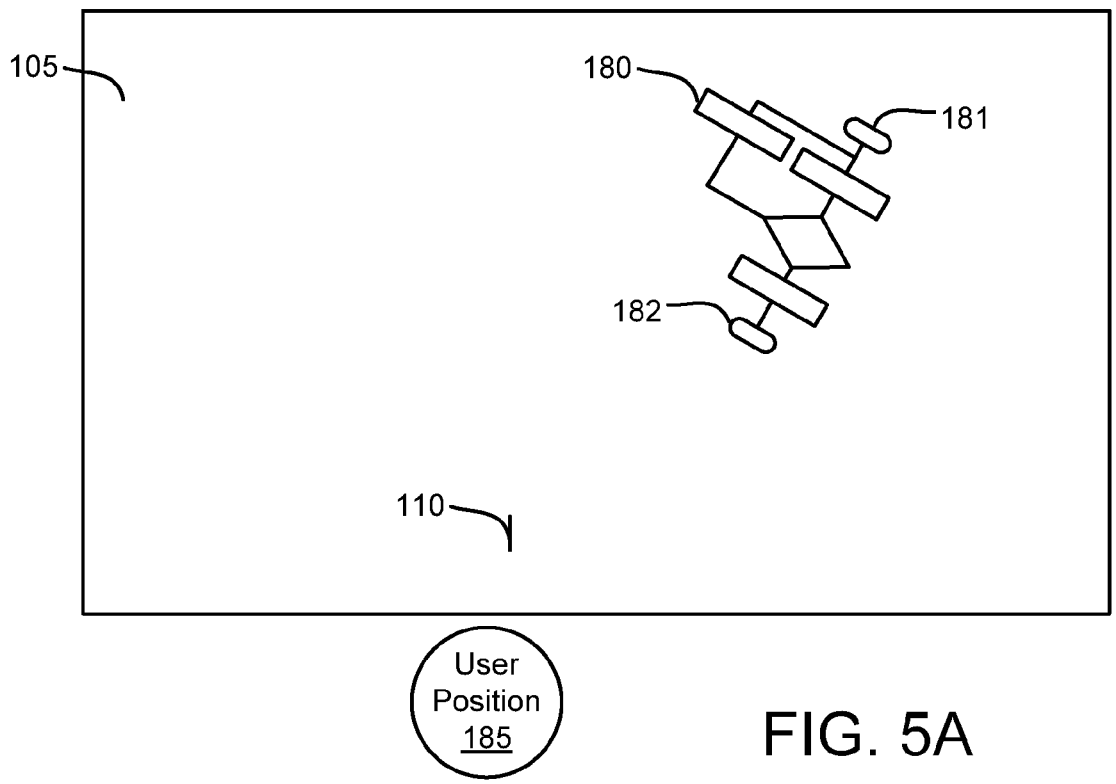
FIGS. 5A-J are drawings illustrating embodiments of organizing display data on a multiuser display.

FIG. 5A is a top view drawing illustrating one embodiment of organizing display data 180 on a multiuser display 105. The multiuser display 105 may be horizontally disposed as illustrated in FIG. 1. The multiuser display 105 is depicted as displaying display data 180. Although the display data 180 is depicted as a graphical flowchart, one of skill in the art will recognize that the display data 180 may be any type of data that is displayed by electronic devices including text data, image data, video data, and the like.

In the depicted embodiment, a user is located at a user position 185. The user position 185 is adjacent to the multiuser display 105, but is on opposite side of the multiuser display 105 from the display data 180. In addition, the display data 180 is oriented away from the user position 185 rather than towards the user position 185. As used herein, display data 180 is oriented toward the user position 185 when a bottom 181 of the display data 180 is closer to the user position 185 then a top 182 of the display data 180.

The touch object 110 is depicted is disposed on the multiuser display 105. The user position 185 may be determined from the disposition of the touch object 110 on the multiuser display 105 as will be described hereafter. In addition, the display data 180 may be organized on the multiuser display 105 in response to the user position 185.

Figure 5B:
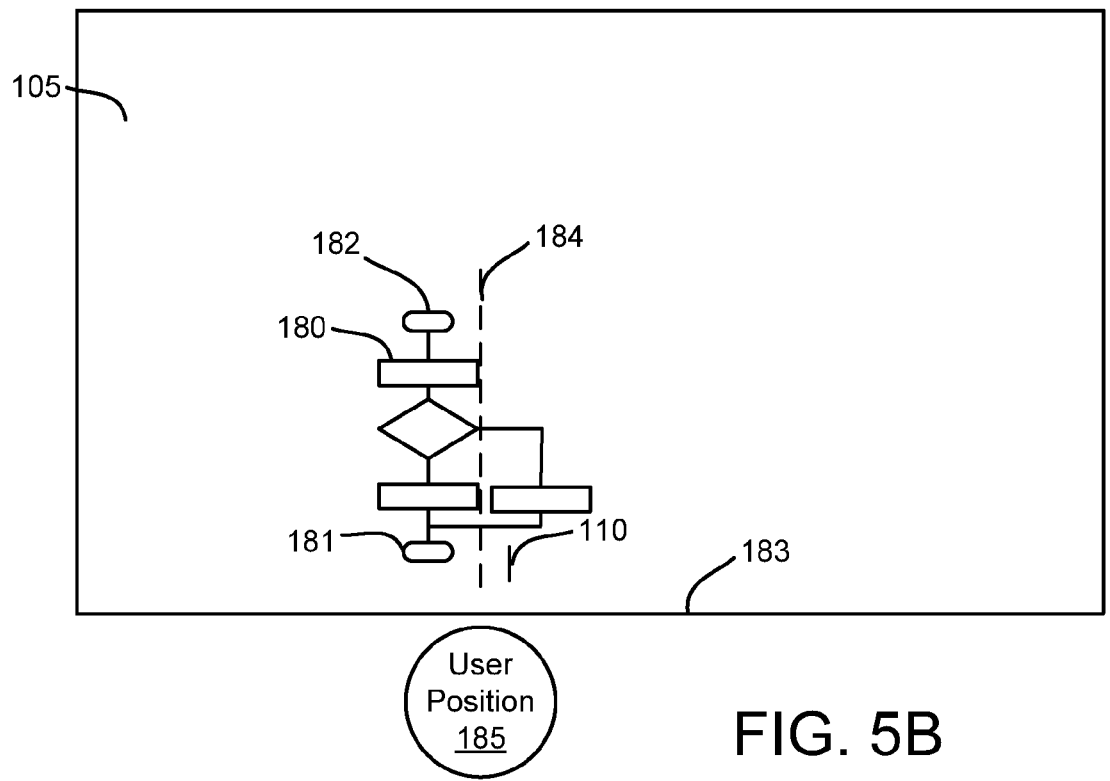

FIG. 5B is a top view drawing illustrating one embodiment of organizing display data 180 on the multiuser display 105. In response to determining the user position 185 from the disposition of the touch object 110 on the multiuser display 105 as illustrated in FIG. 5A, the display data 180 is depicted as organized on the multiuser display 105 in response to the user position 185. In the depicted embodiment, the display data 180 is organized as oriented toward the user position 185.

The display data 180 may be oriented towards the user position 185 when a bottom 181 of the display data 180 is adjacent to and parallel to the edge 183 of the multiuser display 105. For example, the display data 180 may be oriented towards one and only one of the four edges 183 of the multiuser display. In one embodiment, the display data 180 is oriented toward the user position 185 when a top-to-bottom axis 184 of the display data 180 is within a specified orientation range of being directed towards the user position 185. The orientation range may be 0 to 30 degrees. Alternatively, the orientation range may be 0 to 50 degrees.

In one embodiment, the display data 180 is oriented towards the user position 185 when the bottom 181 of the display data 180 is disposed near an edge 183 of the multiuser display 105 closest to the user position 185 and the top-to-bottom axis 184 is within the specified orientation range of being directed towards the user position 185. In one embodiment, the bottom 181 of the display data 180 is disposed near the edge 183 of the multiuser display 105 that is closest to the user position 185 when the bottom 181 is disposed within zero to 40 cm of the edge 183 of a horizontally disposed multiuser display 105.

Figure 5C:
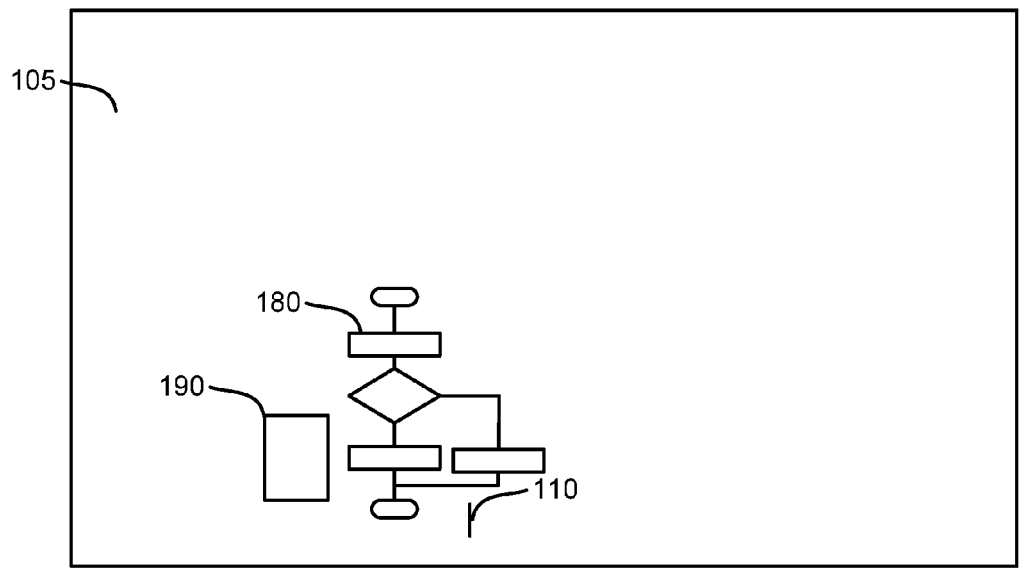

FIG. 5C is a top view drawing illustrating one embodiment of organizing display data 180 on the multiuser display 105. The user position 185 and the display data 180 of FIG. 5B are depicted. In addition, the multiuser display 105 may identify the user at the user position 185 from the user identifier 220 for the touch object 110. Organizing the display data 180 may further comprise providing user information 190 for the user.

The user information 190 may include one or more email accounts, one or more instant messaging accounts, one or more telephone interfaces, one or more video interfaces, one or more financial data interfaces, and one or more media interfaces. In one embodiment, the user information 190 includes data files, documents, data sources, and the like selected by the user. The data files, documents, data sources, and the like may reside on a remote server.

In one embodiment, organizing the display data 180 includes configuring the display data 180 and/or the user information 190 with the user preferences for the user. The user preferences may include but are not limited to display colors, display background, display image size, display font size, display font, and the like.

Figure 5D:
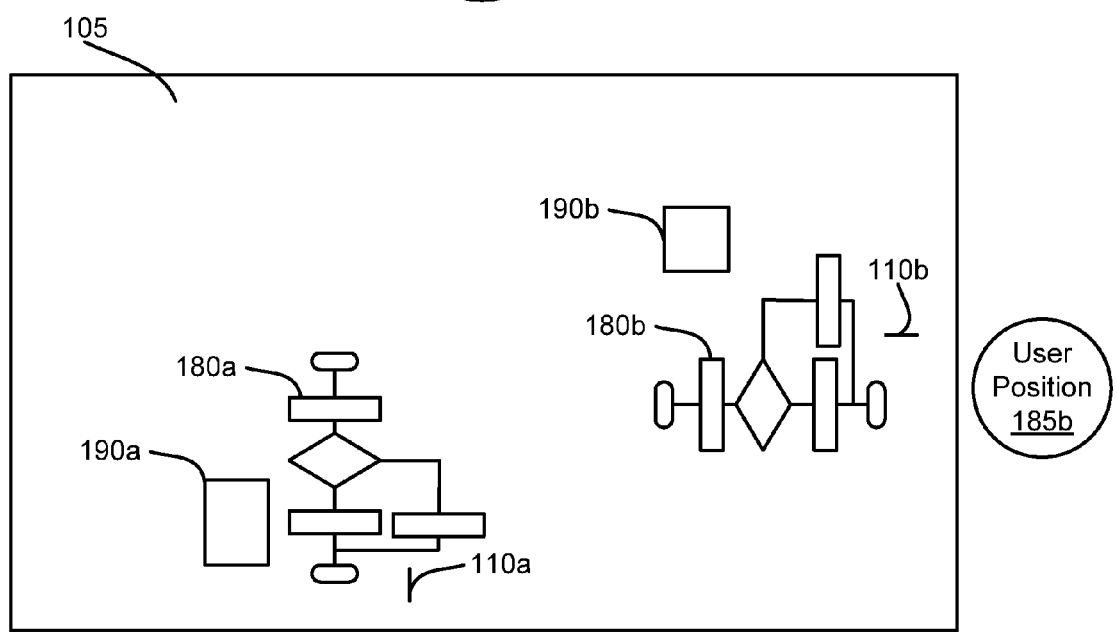

FIG. 5D is a top view drawing illustrating one embodiment of organizing display data 180 on the multiuser display 105. The multiuser display 105 of FIG. 5C is depicted with a first user at a first user position 185a. The first user position 185a may be determined from the disposition of a first touch object 110a on the multiuser display 105. First display data 180a is organized on the multiuser display 105 in response to the first user position 185a.

In addition, a second user is at a second user position 185b. The second user position 185b may be determined from the disposition of a second touch object 110b. In response to the first user position 185a and the second user position 185b, the multiuser display 105 organizes the display data 180. In the depicted embodiment, a first instance of the display data 180a is oriented towards the first user position 185a while a second instance of the display data 180b is oriented towards the second user position 185b.

In the depicted embodiment, organizing the display data 180 in response to the first user position 185a and the second user position 185b includes displaying first user information 190a for the first user position 185a and displaying second user information 190b for the second user position 185b. The first user information 190a may be oriented towards the first user position 185a while the second user information 190b may be oriented towards the second user position 185b.

In addition, organizing the display data 184 in response to the first user position 185a and the second user position 185b may further include configuring the first display data 180a with first user preferences for the first user. The second display data 180b may also be configured with second user preferences for the second user.

In an alternative embodiment, the first display data 180a and the second display data 180b are configured with combined preferences that comprise both the first user preferences and the second user preferences. For example, the font size of the combined preferences may be no smaller than the largest font size of the first user preferences and the second user preferences. Similarly, the combined preferences may set to default values for each element of the first user preferences that is not equivalent to the corresponding element of the second user preferences.

Figure 5E:
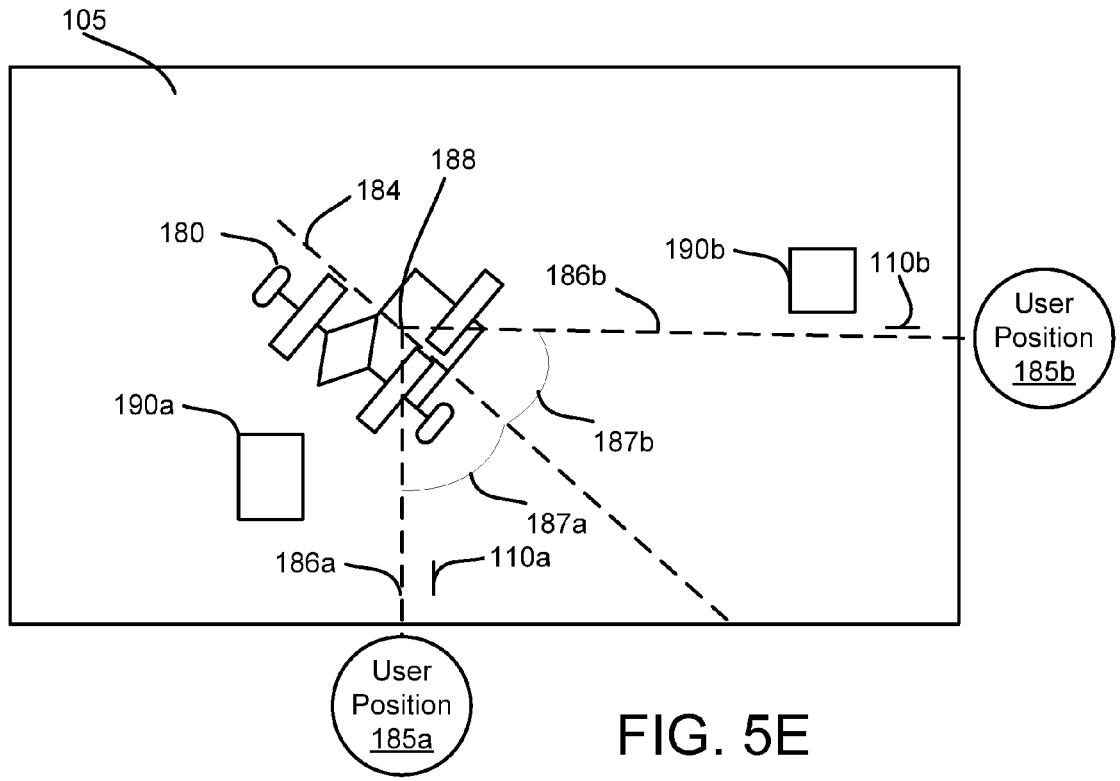

FIG. 5E is a top view drawing illustrating one embodiment of organizing display data 180 on the multiuser display 105. In the depicted embodiment, a single instance of display data 180 is organized as oriented towards both the first user position 185a and the second user position 185b. In one embodiment, the display data 180 is oriented so that a first display angle 187a between the top-to-bottom axis 184 and a first user vector 186a is equivalent to a second display angle 187b between the top-to-bottom axis 184 and the second user vector 186b. In one embodiment, the first and second user vectors 186 are parallel to a plane of the multiuser display 105 disposed in a horizontal position. In one embodiment, each user vector 186 extends from a center 188 of the display data 182 a center of the user position 185. In one embodiment, the user information 190 for each user is oriented to the user position 185 of the user.

Figure 5F:
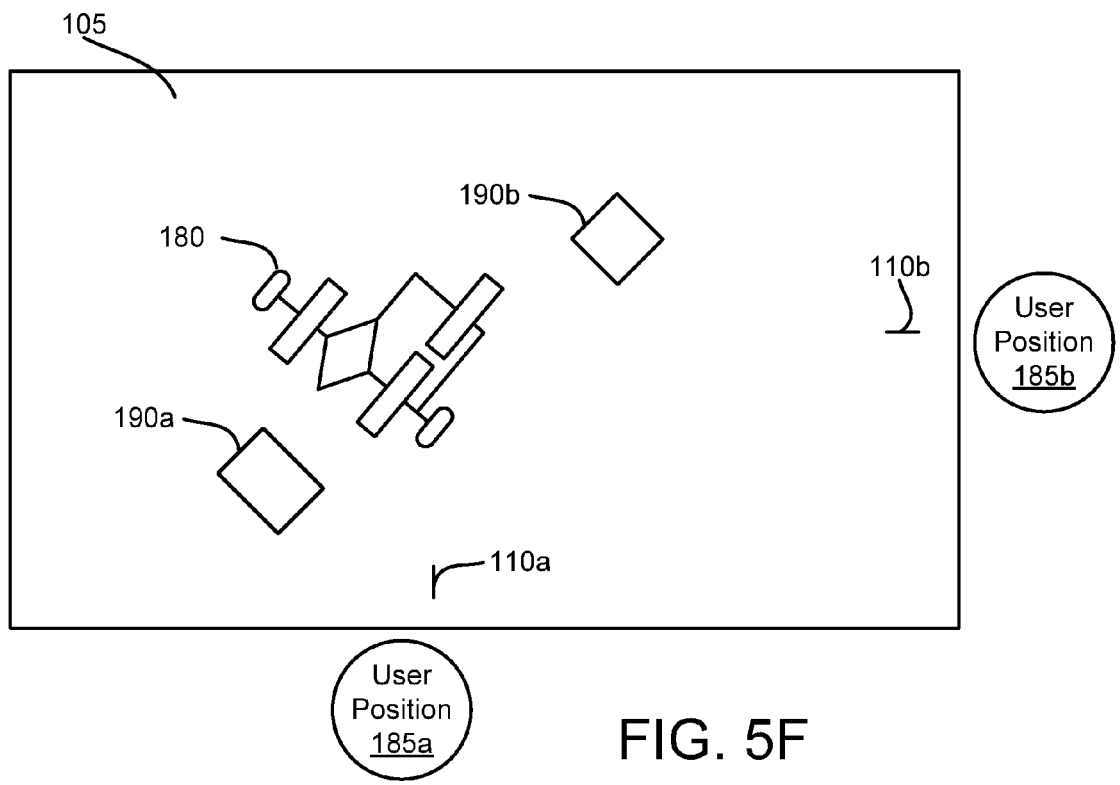

FIG. 5F is a top view drawing illustrating one embodiment of organizing display data 180 on the multiuser display 105. The single instance of display data 180 is organized as oriented towards both the first user position 185a and the second user position 185b as shown in FIG. 5E. In addition, the first user information 190a and the second user information 190b are oriented parallel to the orientation of the display data 180.

Figure 5G:
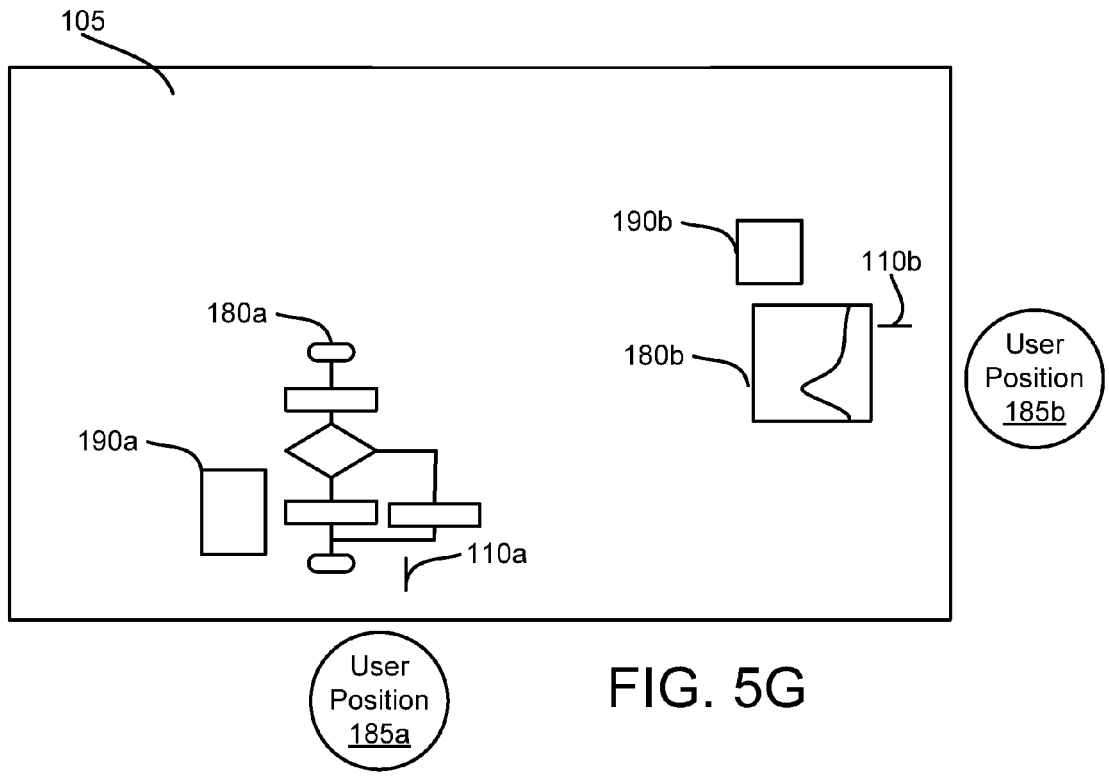

FIG. 5G is a top view drawing illustrating one embodiment of organizing display data 180 on the multiuser display 105. In the depicted embodiment, the first display data 180a is organized as oriented towards the first user position 185a. Second display data 180b that is different from the first display data 180a is organized as oriented towards the second user position 185b. Thus a first user at the first user position 185a and the second user at the second user position 185b may concurrently view different display data 180.

Figure 5H:
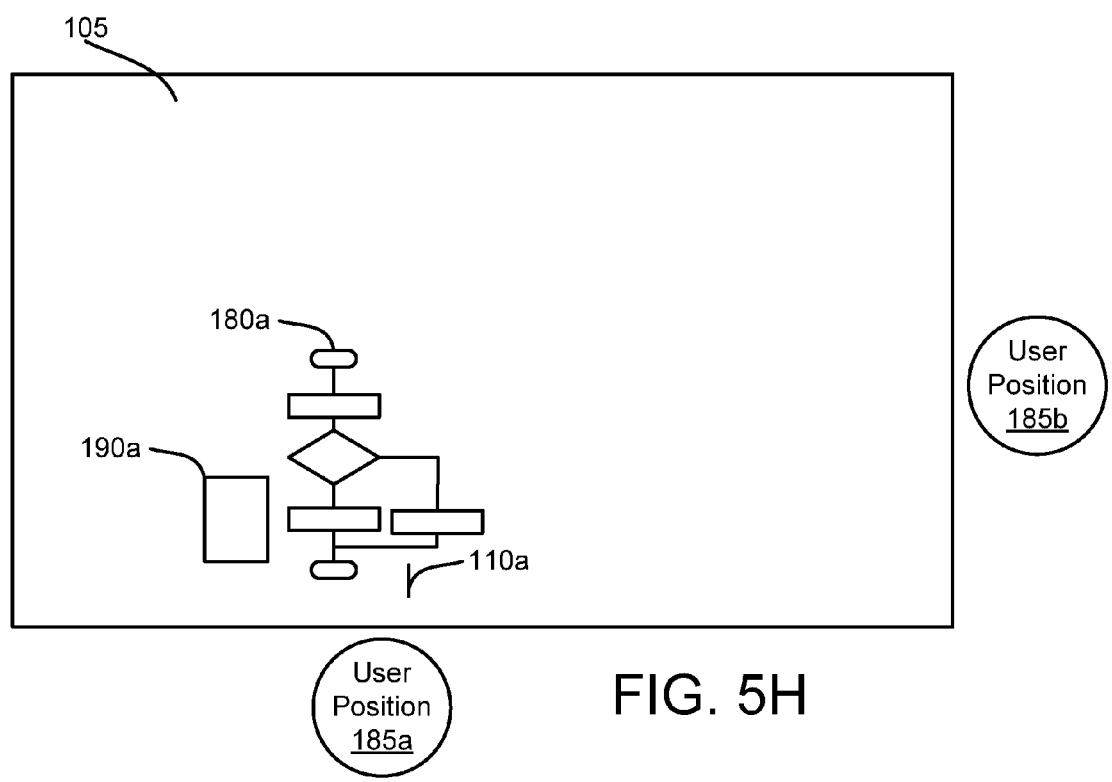

FIG. 5H is a top view drawing illustrating one embodiment of organizing display data 180 on a multiuser display 105. In the depicted embodiment, the display data 180 is oriented towards a first user position 185a in response to the most recent contact of the multiuser display 105 by a first contact object 110a associated with the first user position 185a. If a second user at a second user position 185b subsequently made a most recent contact of the multiuser display 105 with the second touch object 110b, the display data 180 may be subsequently be oriented towards the second user position 185b.

Figure 5I:
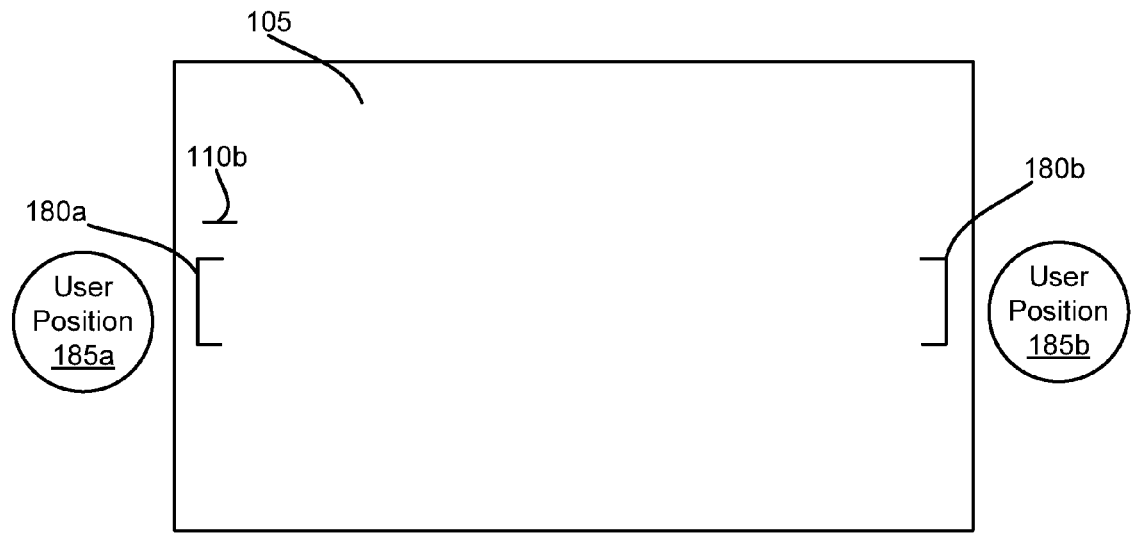

FIG. 5I is a top view drawing illustrating one embodiment of organizing display data 180 on the multiuser display 105. In the depicted embodiment, first display data 180a is organized as oriented toward a first user position 185a in response to determining the first user position 185a from the disposition of the first touch object 110a on the multiuser display 105.

The second user position 185b is determined relative to the first user position 185a. In addition, second display data 180b is organized as oriented toward the second user position 185b. The second user position 185b may be inferred solely from the first user position 185a.

In the depicted embodiment, first and second users are playing a game of air hockey. The first user position 185 is determined from the disposition of the first touch object 110a. The second user position 185b is determined relative to the first user position 185a as opposite the first user position 185a.

Figure 5J:
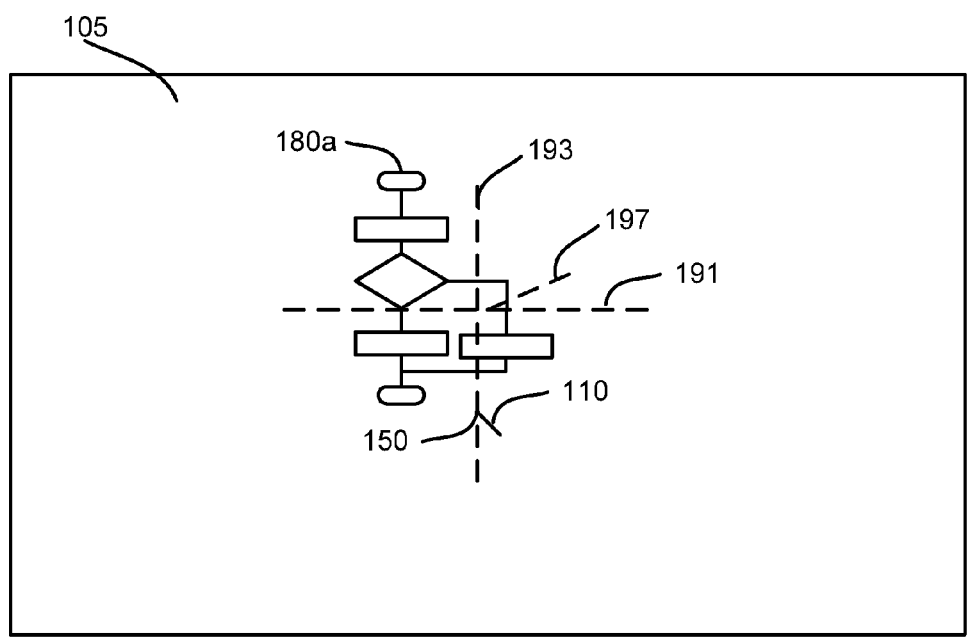

FIG. 5J is a side view drawing illustrating one embodiment of organizing display data 180 on the multiuser display 105. In the depicted embodiment, the multiuser display 105 is vertically disposed. In one embodiment, the user position 185 is determined to be on a vector 197 normal to a plane of the multiuser display 105 and intersecting an intersection of a vertical vector 193 passing through the location 150 and an estimated eye level 191 of the user.

In one embodiment, the estimated eye level 191 is determined from a height of the user. Alternatively, the estimated eye level 191 may be determined by querying the user.

Figure 6:
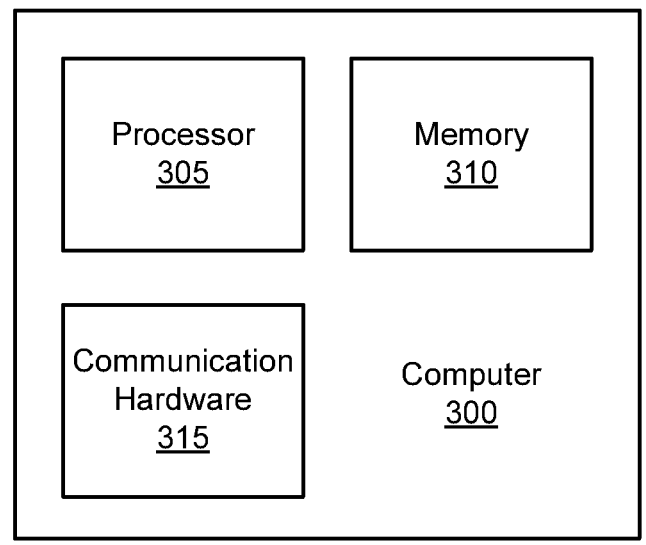
FIG. 6 is a schematic block diagram illustrating one embodiment of a computer.

FIG. 6 is a schematic block diagram illustrating one embodiment of a computer 300. The computer 300 may be embodied in the multiuser display 105, connected to the multiuser display 105, or combinations thereof. The computer 300 includes a processor 305, a memory 310, and communication hardware 315. The memory 310 may be a semiconductor storage device, a hard disk drive, an optical storage device, a micromechanical storage device, or combinations thereof. The memory 310 may store machine readable code. The machine readable code may be executed by the processor 305 to perform one or more functions. The communication hardware 315 may communicate with other devices.

Figure 7:
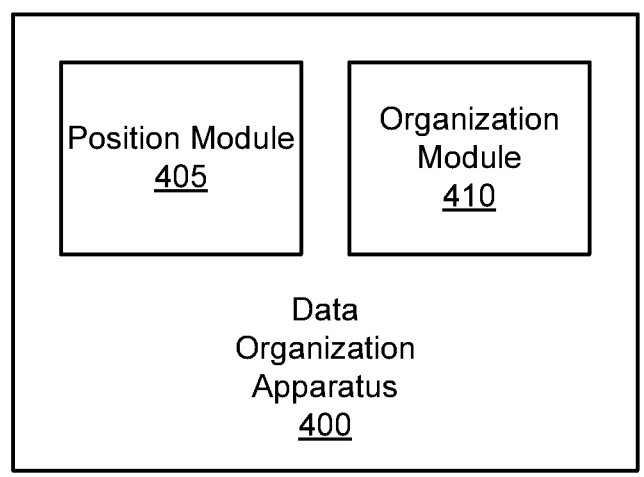
FIG. 7 is a schematic block diagram illustrating one embodiment of a data organization apparatus.

FIG. 7 is a schematic block diagram illustrating one embodiment of a data organization apparatus 400. The apparatus 400 may be embodied in the computer 300 of FIG. 6. The apparatus 400 may include a position module 405 and an organization module 410. The position module 405 and the organization module 410 may be embodied in a memory 310 storing machine readable code executable by a processor 305.

The position module 405 determines a first user position 185a from a disposition of a first touch object 110a on a multiuser display 105. The organization module 410 organizes display data 180 on the multiuser display 105 in response to the first user position 185a.

Figure 8:
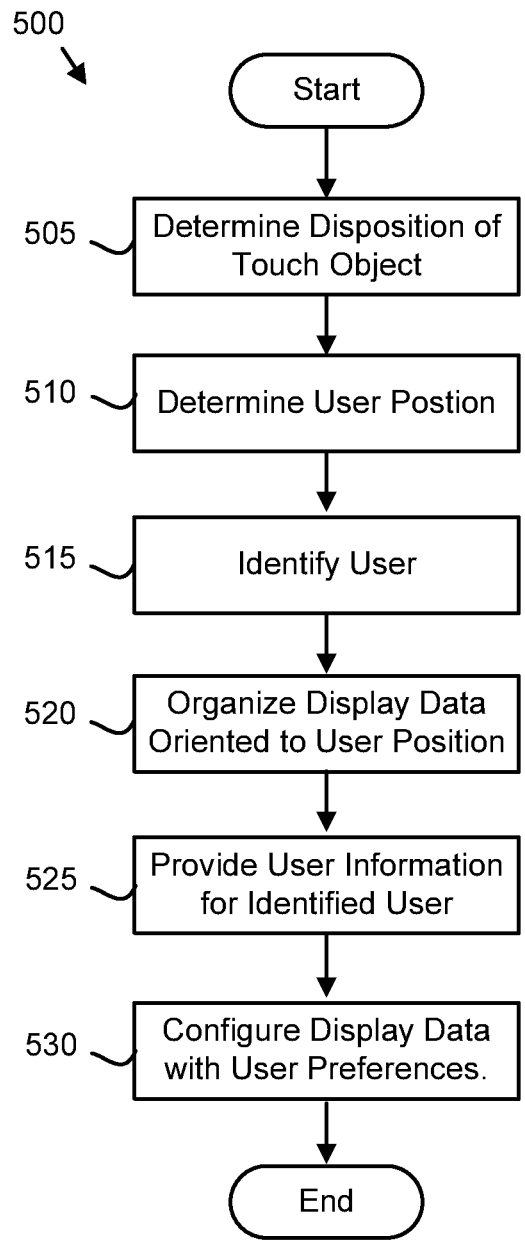
FIG. 8 is a schematic flow chart diagram illustrating one embodiment of a display data organization method.

FIG. 8 is a schematic flow chart diagram illustrating one embodiment of a data organization method 500. The method 500 may perform the functions of the multiuser display 105 and the apparatus 400. In one embodiment, the method 500 is performed by the processor 305. Alternatively, the method 500 may be performed by a program product. The program product may comprise a computer readable storage medium such as the memory 310 storing machine readable code that is executable by the processor 305 to perform the operations of the method 500.

The method 500 starts, and in one embodiment, the position module 405 determines 505 a disposition of the touch object 110. In one embodiment, the location 150 of the touch object 110 is determined from a physical contact of the touch object 110 with the multiuser display 105. Alternatively, the location 150 may be determined from one or more of an electromagnetic resonance detection, an electric field detection, a capacitance detection, and an optical detection.

In addition, the orientation 155 of the touch object 110 may be determined from accelerometers within the touch object 110. The orientation 155 may be wireles sly communicated from the touch object 110 to the multiuser display 105. In an alternative embodiment, the orientation 155 of the touch object 110 is optically detected by one or more video cameras embodied in the multiuser display 105.

In one embodiment, the disposition of the touch object 110 is determined 505 from a handprint associated with the touch object 110. For example, the first angle 160 of the orientation 155 may be estimated to be along a vector extending from the location 150 to a center of a handprint associated with the touch object 110. The handprint may be associated with the touch object 110 if the handprint is within 1 to 12 cm of the location 150. Alternatively, the first angle 160 of the orientation 155 may be estimated to be along a vector extending from the location 150 to of a point on the handprint furthest from the location 150. The position module 405 may determine 505 dispositions for a plurality of the touch objects 110.

The position module 405 may further determine 510 the first user position 185a from the disposition of a first touch object 110a on a multiuser display 105. In one embodiment, the position module 405 determines 510 a plurality of user positions 185 from the disposition of a plurality of touch objects 110.

If the multiuser display 105 is horizontally disposed, the first user position 185a may be determined to be located adjacent an edge 183 of the multiuser display 105 with the center at the first angle 160 from the location 150 of the touch object 110. In one embodiment, adjacent to the edge of the multiuser display 105 is within 0 to 40 cm of an edge 183 of the multiuser display 105.

In an alternative embodiment, the first user position 185a is determined to be located adjacent an edge of the multiuser display 105 with the center at the first angle 160 plus a specified offset angle from the location 150 of the touch object 110 on the horizontally disposed multiuser display 105. The specified offset angle may be between 5 and 25 degrees. In one embodiment, the specified offset angle is counterclockwise from the first angle 160 for a right-handed user and clockwise from the first angle 160 for a left-handed user.

For a vertically disposed multiuser display 105, the first user position 185a may be determined to be located adjacent to the plane of the multiuser display 105 along the vector of the orientation 155. As used herein, adjacent to the plane of the multiuser display 105 is between 8 and 50 cm from the plane of the multiuser display 105.

For vertically disposed multiuser display 105, the first user position 185a may be the estimated eye level 191 of the user. In one embodiment, the estimated eye level 191 is determined to be at the second angle 165 plus and elevation angle. The elevation angle may be in the range of 20 to 45 degrees. In addition, the first user position 185a may be normal to the intersection of the estimated eye level 191 and the vertical vector 193 passing through the location 150. Alternatively, the first user position 185a may be along a vector 197 normal to the multiuser display 105 and intersecting the intersection of the estimated eye level 191 and the vertical vector 193 plus a horizontal offset. The horizontal offset may be in the range of 4 to 18 cm. In one embodiment, the horizontal offset is to the left for right-handed users and to the right for left-handed users.

The position module 405 may further identify 515 the user. In one embodiment, the position module 405 receives the touch object identifier 205 from the touch object 110. The position module 405 may further consult the touch object data record 200 and retrieved the user identifier 220, identifying the user with the user identifier 220. In an alternative embodiment, the position module 405 identifies 515 the user from a biometric measurement of the user. For example, the multiuser display 105 may record a palm print of the user and identify the user from the palm print. In one embodiment, the position module 405 identifies 515 a plurality of users.

In an alternate embodiment, the position module 405 may query the user at the first user position 185a for the identity of the user. The user may self identify in response to the query.

In a certain embodiment, a video camera of the multiuser display 105 may identify the user from a biometric identification selected from a facial identification, a retinal identification, and the like. Alternatively, a microphone of the multiuser display 105 may identify the user from an audio input such as a voice pattern.

The orientation module 410 may organize 520 the display data 180 on the multiuser display 105 in response to the first user position 185a. In one embodiment, the display data 180 is organized as oriented toward the first user position 185a as illustrated in FIG. 5B.

in an alternate embodiment, the organization module 410 may organize 520 a first instance of the display data 180a as oriented towards the first user position 185a and organize 520 a second instance of the display data 180b as oriented towards a second user position 185b as illustrated in FIG. 5D. Thus multiple users gathered around the multiuser display 105 may each be able to clearly view an instance of the display data 180. In one embodiment, changes to one instance of the display data 180 are propagated to other instances of the display data 180.

The organization module 410 may organize 520 the display data 180 in response to the first user position 185a and the second user position 185b so that the display data 180 is partially oriented towards both the first user position 185a and the second user position 185b as illustrated in FIG. 5F. Thus the multiuser display 105 may display the single instance of the display data 180 for the users at both the first user position 185a and the second user position 185b. In one embodiment, the organization module 410 organizes 520 the display data 180 for a plurality of user positions 185.

The organization module 410 may further provide 525 user information 190 for the first user at the first user position 185a. In addition, the organization module 410 may configure 530 the display data 180 with user preferences for the user and the method 500 ends.

Multiuser displays allow multiple users to cooperatively work on one more sets of display data 180. However, the large size of multiuser displays 105 and the convenient access to the multiuser displays 105 from multiple user positions 185 make it possible for the multiuser display 105 to provide the display data 180 at positions and orientations that are inconvenient to the users. Rather than restricting the user positions from which a user can work with the multiuser display 105 or requiring the users to explicitly configure the multiuser display 105, the embodiments determine a user position 185 from the disposition of a touch object 110 such as an electronic pen, a stylus, or a finger.

By determining the user position 185 for the user of the multiuser display 105, the embodiments automatically organize the display data 180 so the display data 180 is most advantageously viewed by the user. Thus while the user is working with the multiuser display 105, the user is free to move relative to the multiuser display 105 without constantly adjusting the organization and orientation of the display data 180.

In addition, the embodiments may organize the display data 180 for multiple user positions 185. The embodiments may determine multiple user positions 185 from multiple dispositions of touch objects 110 and organize the display data 180 for the multiple user positions 185. Thus multiple users may work with the multiuser display 105 from a variety of positions without explicitly reconfiguring the position and orientation of display data 180.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a multiuser display accessible to the processor; and
a memory storing machine readable code executable by the processor, the machine readable code comprising:
a position module determining a first user position from a disposition of a first touch object on the multiuser display, the disposition comprising a location of the first touch object on the multiuser display and an orientation of the first touch object comprising a first angle from a specified axis of the multiuser display and a second angle from a plane of the multiuser display; and
an organization module organizing display data on the multiuser display in response to the first user position.

2. The apparatus of claim 1, wherein the display data is organized as oriented toward the first user position.

3. The apparatus of claim 1, the position module further determining a second user position from a disposition of a second touch object and the organization module organizing the display data in response to the first user position and the second user position.

4. The apparatus of claim 1, wherein the first touch object is detected using a detection selected from the group consisting of electromagnetic resonance detection, electric field detection, capacitance detection, and optical detection.

5. A method comprising:
determining a first user position from a disposition of a first touch object on a multiuser display, the disposition comprising a location of the first touch object on the multiuser display and an orientation of the first touch object comprising a first angle from a specified axis of the multiuser display and a second angle from a plane of the multiuser display; and
organizing display data on the multiuser display in response to the first user position.

6. The method of claim 5, wherein the display data is organized as oriented toward the first user position.

7. The method of claim 5, further comprising determining a second user position from a disposition of a second touch object and organizing the display data in response to the first user position and the second user position.

8. The method of claim 5, further comprising identifying a first user from a touch object identifier.

9. The method of claim 8, wherein the display data is provided with user information for the first user.

10. The method of claim 8, wherein the display data is configured with user preferences for the first user.

11. The method of claim 8, wherein the disposition further comprises a handprint associated with the touch object.

12. The method of claim 5, wherein the touch object is selected from the group consisting of an electronic pen, a stylus, and a finger.

13. The method of claim 5, wherein the first touch object is detected using a detection selected from the group consisting of electromagnetic resonance detection, electric field detection, capacitance detection, and optical detection.

14. The method of claim 5, wherein a second user position is determined relative to the first user position.

15. A program product comprising a non-transitory computer readable storage medium storing machine readable code executable by a processor to perform the operations of:

determining a first user position from a disposition of a first touch object on a multiuser display, the disposition comprising a location of the first touch object on the multiuser display and an orientation of the first touch object comprising a first angle from a specified axis of the multiuser display and a second angle from a plane of the multiuser display; and organizing display data on the multiuser display in response to the first user position.

16. The program product of claim 15, wherein the display data is organized as oriented toward the first user position.

17. The program product of claim 15, further comprising determining a second user position from a disposition of a second touch object and organizing the display data in response to the first user position and the second user position.

18. The program product of claim 15, further comprising identifying a first user from a touch object identifier.

* * * * *